United States Patent [19]
Fricke

[11] Patent Number: 5,026,996
[45] Date of Patent: Jun. 25, 1991

[54] LINE SCANNER

[76] Inventor: William C. Fricke, 9 Jessie St., New Fairfield, Conn. 06812

[21] Appl. No.: 475,414

[22] Filed: Feb. 5, 1990

[51] Int. Cl.⁵ ................................................ G01J 1/58
[52] U.S. Cl. .................. 250/461.1; 250/365; 250/372
[58] Field of Search ..................... 250/461.1, 365, 372, 250/458.1

[56] References Cited

U.S. PATENT DOCUMENTS 4,626,693 12/1986 Hirschfeld ........................ 250/461.1
4,916,319 4/1990 Telfair et al. ........................ 250/365

Primary Examiner—Carolyn E. Fields
Assistant Examiner—Drew A. Dunn
Attorney, Agent, or Firm—Edward R. Hyde

[57] ABSTRACT

A device for scanning a linear section of a UV beam to determine the local intensity thereof along the linear section. The UV beam impinges upon flourescent material and the fluorescent emission distribution is meausred to indicate the UV beam intensity.

19 Claims, 2 Drawing Sheets

LINE SCANNER

BACKGROUND OF THE INVENTION

1. Field of the Invention

The present invention relates to a system for analyzing the intensity distribution across an ultraviolet (UV) laser beam. The various commercial and medical applications of laser beams makes it necessary to monitor and control the intensity distribution across the face of the beam and various techniques have been devised for measuring the intensity profile of laser radiation.

One such technique is disclosed in the above cited patent application in which a beam intensity profilometer produces fluorescent emission distribution having a spacial distribution linearly proportional to the local intensity of the incident UV beam impinging upon the profilometer. The spacial distribution of the UV beam is analyzed as a function of the fluorescent emission.

The present invention makes use of the fluorescent materials disclosed in the above cited application which provide a visible fluorescent emission as a function of the impinging UV beam to be analyzed. However, the present invention analyzes a line or linear section across the face of the impinging UV laser beam.

2. Description of the Prior Art

A number of prior patents exist directed to the measuring of the wave front of a laser beam and these include: U.S. Pat. Nos. 3,462,601; 3,549,886; 3,598,998; 3,680,965; 4,260,251; 4,376,892; 4,490,039; 4,602,272; and 4,670,646. However, none of these patents disclose the use of a strip of UV activated fluorescent material as with the present invention.

A description of various prior art systems was disclosed in a paper entitled "Characterization of UV Laser Beams Using Fluorescence", by Telfair et al., delivered at the Society of Photo-Optical Instrumentation Engineers (SPIE) on Jan. 15, 1988 in Los Angeles, Calif. and in articles entitled "Choosing And Using Laser-Beam-Profile Monitors", by Edwards, in *Laser Focus/Electron-Optics*, May 1987, pgs. 76–84 and "Laser Beam Profiling The Automated Way", by Rypma, *Photonics Spectra*, August 1987, pgs. 67–74.

A material which has been found to be particularly useful in converting invisible UV radiation to visible fluorescent radiation is a rare earth doped garnet, Ce 3+: $Y_3 Al_5 O_{12}$ (YAG). The ability of this material to fluoresce is described in an article entitled "CATHODOLUMINESCENT GARNET LAYERS" by J. M. Robertson, *Thin Solid Films*, 114 (1984) 221–240. The article, however, does not disclose the concept of measuring a high powered UV laser beam with an instrument incorporating the doped YAG material.

The above patents and additional publications are described and discussed in the above-cited parent application. None of this prior art discloses the present system of utilizing UV activated fluorescent material to analyze a section of a UV beam.

SUMMARY OF THE INVENTION

Against the foregoing background it is a primary object of the present invention to provide a line scanner for displaying the intensity distribution along any line across an incident UV beam such as that produced by an excimer laser.

It is another object of the present invention to provide a conveniently held portable line scanner for analyzing and diagnosing the intensity distribution of a UV laser beam.

It is a further object of the present invention to provide a hand held UV beam line scanner that is adapted to be conveniently moved across the face of a laser beam to provide a intensity distribution analysis of the beam.

The scanner of the present invention is a direct reading instrument for displaying the intensity distribution along any line in a UV beam such as that produced by an excimer laser. The line is formed by a narrow slit at the entrance of the aperture and the beam slice formed by this slit impinges on fluoresent material located behind the slit. The fluorescence distribution along the slit is proportional to the local UV beam intensity and, hence, represents the intensity distribution of the UV beam along the line.

BRIEF DESCRIPTION OF THE DRAWINGS

The foregoing and still other objects and advantages of the present invention will be more apparent from the following detailed explanation of the preferred embodiments of the invention in connection with the accompanying drawings in which.

DETAILED DESCRIPTION OF THE PREFERRED EMBODIMENT

The line scanner of the present invention analyzes the beam intensity of a UV beam by converting the UV radiation to visible light by the use of a fluorescent material of the type described in the above-cited parent application. The selection of the proper fluorescent material is an important part of the present invention. It must have certain characteristics such as a high damage threshold for withstanding power intensity of high energy UV lasers, and it must emit a fluoresence whose intensity is substantially linearly proportional to the local intensity of the incident UV beam. The material chosen is from a class of materials which are optically transparent to fluorescent wave lengths.

In the preferred embodiment, the fluorescent material is a Ce 3+; $Y_3 Al_5 O_{12}$ (YAG). Besides cerium (Ce), other rare earth elements suitable for doping include neodymium (Nd), lanthanum (La) and Europium (Eu). However, it is within the terms of the present invention to dope the crystal with any suitable rare earth.

The fluorescent material can also comprise rare earth doped glasses. The glass could consist of any class of glasses, such as borosilicate glass, doped with any of the rare earth materials including Ce, Nd, Eu and La.

The fluorescent material can also be suspended in plastic. For example, a rare earth doped crystal, a rare earth doped glass or an undoped crystal could be pulverized and suspended in a plastic. Also, a plastic can be modified by either doping or chemically adding a dye or a rare earth element.

Figure 1:
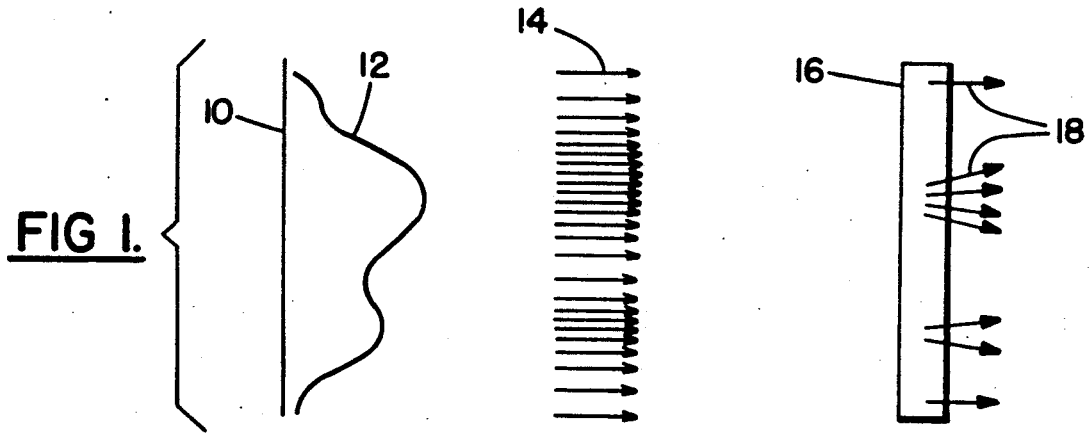
FIG. 1 is a schematic illustration of the principle of converting the UV radiation to fluorescence.

Referring now to FIG. 1, there is shown an incident UV beam 10 having for example an intensity distribution shown by line 12 and vector arrows 14. A fluorescent distribution element 16 is interposed in the path of UV beam 10 to receive the incident radiation and provides fluorescent radiation in the visible spectrum as indicated at 18. The resulting fluorescent radiation is substantially linearly proportional to the local intensity of the incident ultraviolet beam 10. Thus by analyzing the fluorescent radiation and noting the intensity thereof, the UV laser beam 10 is diagnosed and analyzed.

Whereas the invention of the above-cited parent application provides a plate of substantial area to produce the fluorescent emission representing the entire area of interest of the incident UV beam, the present invention scans a line or linear section of the UV radiation and hence only a line or linear section of the incident beam is analyzed at any point in time.

Figure 2:
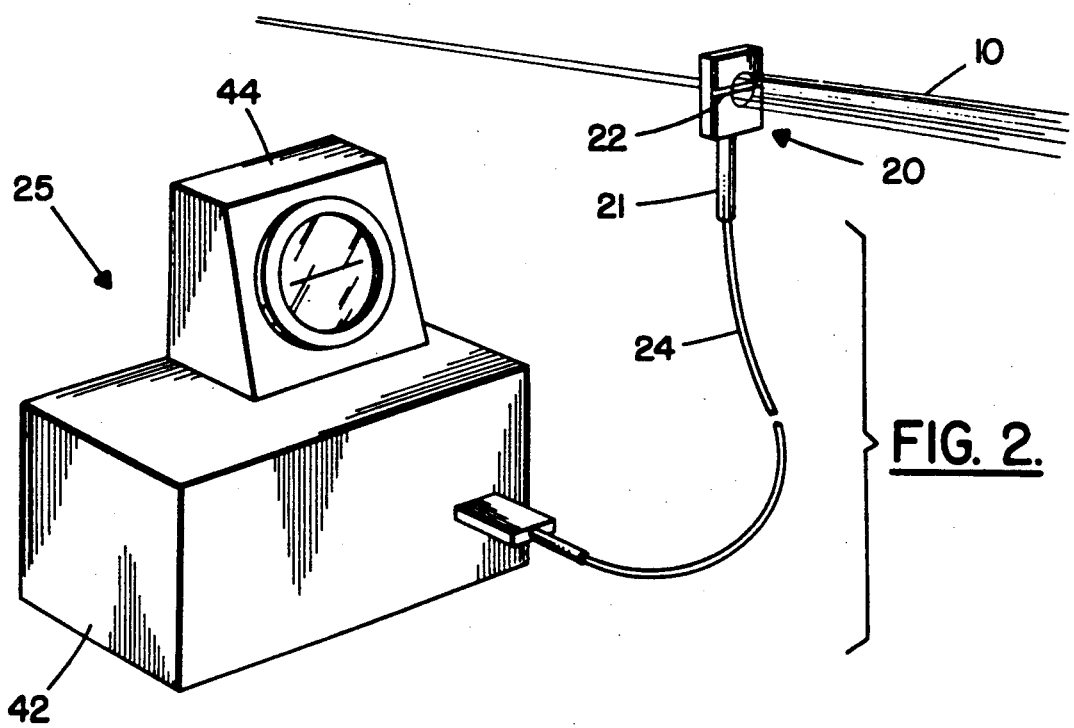
FIG. 2 is a schematic perspective of the line scanner of the present invention.

Referring now to FIG. 2, there is shown the incident UV radiation 10 as from an eximer laser. The line scanner of the present invention includes a head 20, a handle 21, light transmission element 24, and readout unit 25. The line scanner head 20 has a linear aperture 22 which permits a linear section of the incident beam to enter the line scanner head for analysis. As will be hereinafter described in detail, the entering line section of the beam will impinge upon a strip of fluorescent material of the type above described and also described in the parent application which will fluoresce linearly in accordance with the incident UV beam. The fluorescent radiation is transmitted by a plurality of optical fibers generally indicated at 24 to the readout unit.

Figure 3:
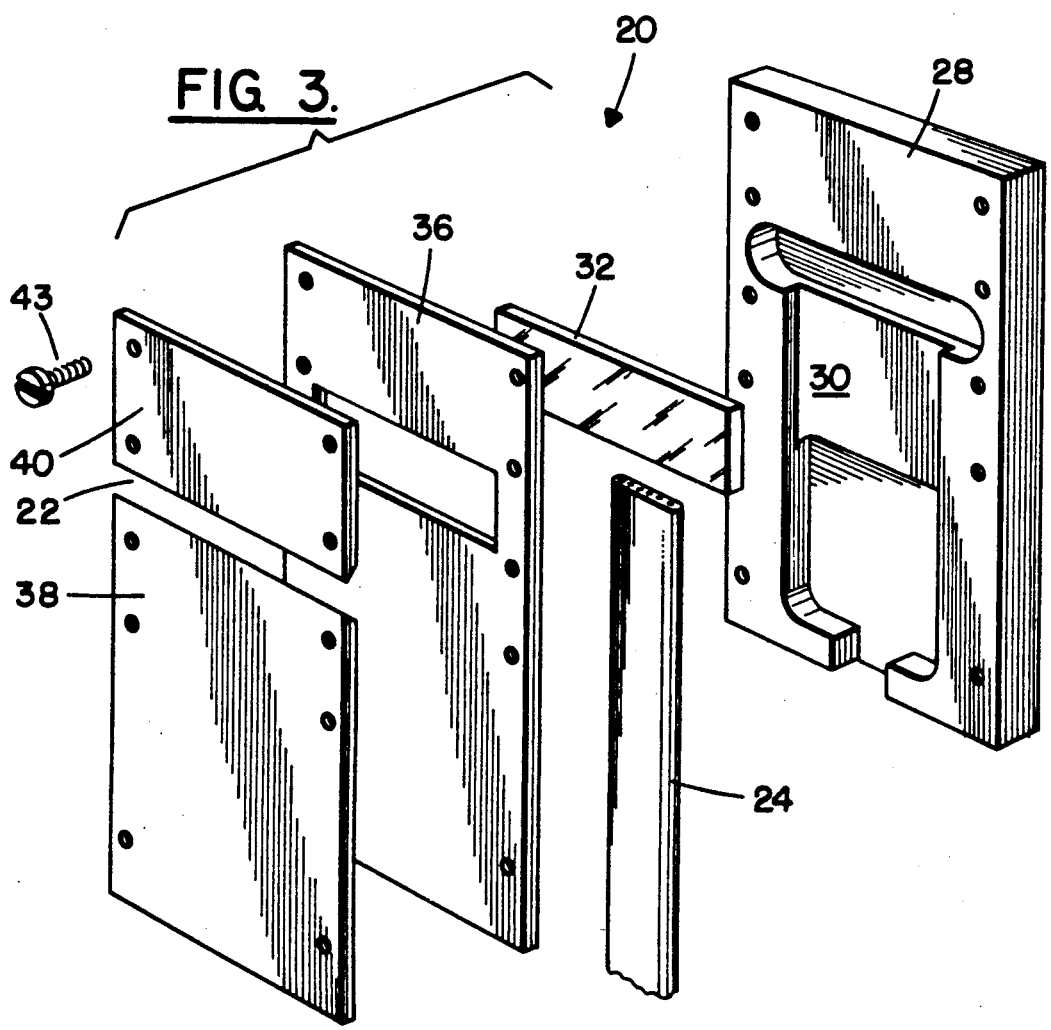
FIG. 3 is an exploded view of the line scanner head.

Referring now to FIG. 3, there is shown an exploded view of the head unit 20. The unit includes a base member 28 having a cutout portion 30 which receives a strip of fluorescent material 32 and the end of a ribbon 24 of optical fibers. With the ribbon and fluorescent strip in place within the base 28, a cover plate 34 having a rectangular opening 36 is secured to the base member 28. Plates 38, 40 provide an aperture slit 22 through which the incident radiation passes to impinge upon the fluorescent strip 32. The entire head assembly is held together by screws as 43.

Figure 4:
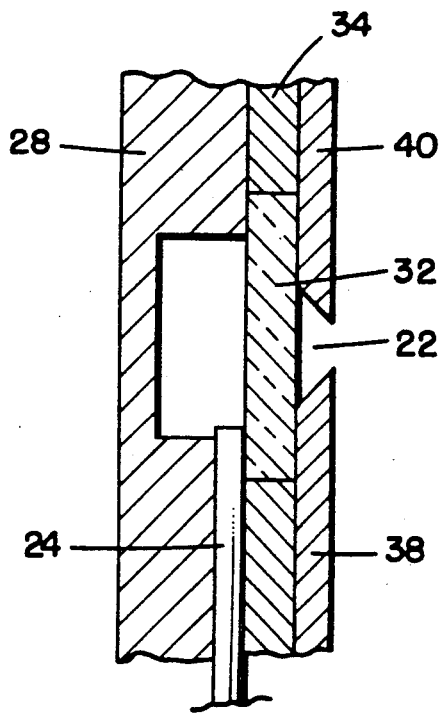
FIG. 4 is a detailed view showing the linear aperture, the fluorescent strip and the ends of the fiber optics.

Referring now to FIG. 4, there is shown the assembled head unit with the fluorescent strip 32 located directly behind the aperture 22. The ribbon of optical fibers 24 enters the head assembly and terminates just behind the fluorescent strip positioned to receive the fluorescent emission. The fibers collect the fluorescence and coherently transmit it to the readout unit 25. A coherent fiber bundle must be used to insure a one-to-one transfer of the fluorescence to the display. The fiber ribbon typically consists of about 250 fibers molded into a flat ribbon approximately 0.2 mm. thick, 45 mm. wide and 2 m. long. No optics are necessary at the input end of the fiber because the acceptance angle of each fiber limits fluorescence collection to a small area on the plate directly in front of the fiber. The size of the collection area is determined by the acceptance angle of the fiber and the distance between the fiber and the plate 32.

It is understood that the width of the entrance slit determines the width of the line section of the beam 10 that is analyzed. It has been found that an aperture width of 0.5 mm. provides adequate resolution for analysis. The resolution can be increased by decreasing the width of the aperture to analyze a narrower linear section of the incident UV beam.

Figure 5:
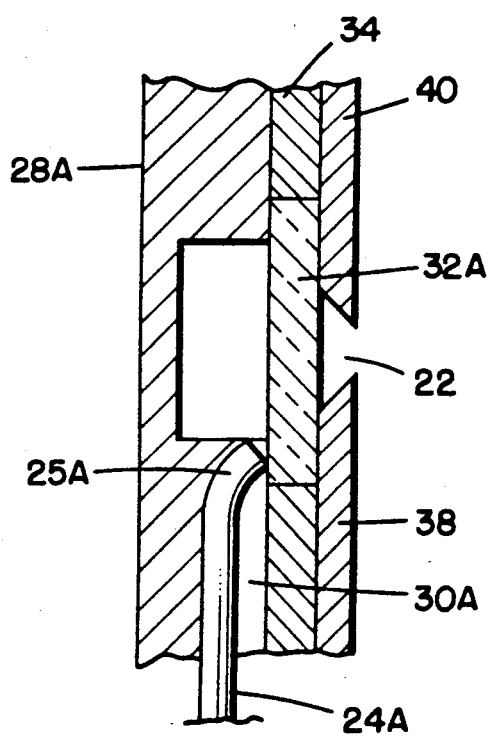
FIG. 5 is a modification of the arrangement shown in FIG. 3.

Referring not to FIG. 5 there is shown a modification in which the lower portion of the cutout 30A in the base member is of a greater depth to permit the fiber ribbon 24A to be curved at its input end as at 25A. The forward bend in the ribbon is directed to the rear surface of the fluorescent strip 32A to enhance the light gathering of the fluorescent emission by the optical fibers.

Referring back to FIG. 2 it is seen that the optical fiber ribbon 24 connects to a detector unit 42 which may include a plurality of detectors equal in number to the optical fibers such that the output fluorescence of each fiber is converted to an electrical signal. These detectors may be of any conventional photo detector type and the fluorescence may be coupled to the detectors by appropriate lenses. Scanning the individual detectors in the array will produce a signal that can be displayed, for example, on a oscilloscope 44. It is understood that the electronics will also produce a trigger signal each time the detector array is scanned that triggers the start of the oscilloscope sweep. The particular design of the detectors and electronic control for the oscilloscope can take any conventional form and does not form part of the present invention.

In operation, the operator holding the head 20 will interpose it in the UV beam to be analyzed or diagnosed. The entrance slit 22 will determine a slice or linear section of the beam that is passed to the fluorescent strip 32. The resulting fluorescence, the intensity of which is linearly proportional to the intensity of the slice of the UV beam being scanned, will be passed to the readout unit 25 and appear on the oscilloscope 44. The operator may move the head 20 so that the aperture 22 sweeps a large area of the UV beam or the entire beam and in this manner can obtain a readout of the intensity profile of the full area of interest of the beam.

Figure 6:
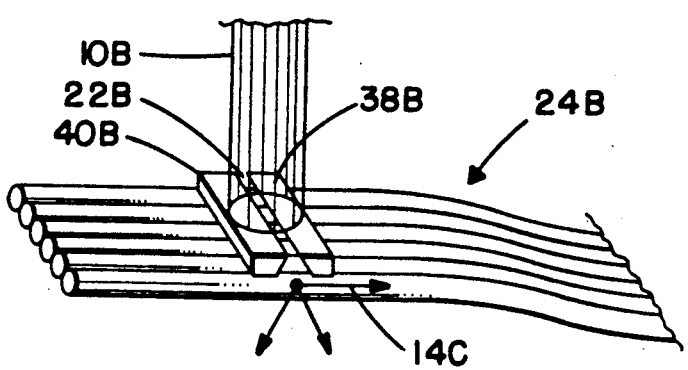
FIG. 6 is a further modification of the invention.

Referring now to FIG. 6, there is shown an embodiment in which the ribbon of optical fibers 24B are of fluorescent material such as sapphire or the other materials described above. Plates 38B and 40B provide an aperture slit 22C through which incident radiation from beam 10B passes to impinge upon a line of fluorescent fibres 24B. It is seen that this embodiment eliminates the separate strip of fluorescent material as 32 and 32A in FIGS. 4 and 5.

In FIG. 6, a proportional amount of the fluorescent radiation 14C will be transmitted through the optical fibres 24B to the readout 25.

Having thus described the invention with particular reference to the preferred forms thereof, it will be obvious that various changes and modifications may be made therein without departing from the spirit and scope of the invention as defined in the appended claims.

What is claimed is:

1. A beam intensity profilometer, comprising:
means to produce a fluorescent emission distribution having a spacial distribution linearly proportional to the local intensity of a linear section of an incident UV beam aimed on the means to produce an emission distribution said means to produce the emission distribution comprising an elongated strip of fluorescent material optically transparent to fluorescent wavelengths; and
means being operatively connected to the fluorescent emission distribution means for displaying and analyzing the spacial distribution of the linear section of the UV beam as a function of the spacial distribution of the fluorescent emission.

2. The beam intensity profilometer of claim 1 wherein the fluorescent emission of said strip is substantially proportional to the incident UV radiation.

3. The beam intensity profilometer of claim 2 wherein the fluorescent material is selected from the group consisting essentially of rare earth doped crystals, rare earth doped glasses, undoped crystals and fluorescent mediums suspended in plastic.

4. The beam intensity profilometer of claim 3 wherein said rare earths are selected from the group consisting essentially of Ce, La, Eu, and Nd.

5. The beam intensity profilometer of claim 4 wherein said rare earth doped crystals comprise a Ce 3+: YAG.

6. Apparatus to determine the intensity of a UV beam comprising:
 narrow slit means providing an entrance aperture to receive a UV beam and define a linear section thereof;
 means positioned behind said entrance aperture to produce a fluorescent emission distribution having a spacial distribution linearly proportional to the local intensity of the said linear section of the UV beam; said means to produce the fluorescent emission distribution comprising a narrow elongated strip of fluorescent material optically transparent to fluorescent wavelengths and extending to receive substantially all radiation entering the entrance aperture;
 optical means positioned adjacent the means to produce fluorescent emission distribution to receive said fluorescent emission;
 means to display the intensity distribution of the linear section of the UV beam as a function of the spacial distribution of the fluorescent emission; and
 means to transmit the fluorescent emission from the optical means to the means to display.

7. Apparatus as defined in claim 6 in which the optical means is a plurality of optical fibers.

8. Apparatus as defined in claim 7 wherein the fluorescent emission of said strip is linearly proportional to the incident UV radiation.

9. Apparatus as defined in claim 8 wherein the fluorescent material is selected from the group consisting essentially of rare earth doped crystals, rare earth doped glasses, undoped crystals and fluorescent mediums suspended in plastic.

10. apparatus as defined in claim 9 wherein said rare earths are selected from the group consisting essentially of Ce, La, Eu, and Nd.

11. Apparatus as defined in claim 10 wherein said rare earth doped crystals comprise a Ce 3+: YAG.

12. Apparatus to determine the intensity of an UV beam comprising:
 narrow slit means providing an entrance aperture to receive a UV beam and define a linear section thereof;
 means positioned behind said entrance aperture to produce a fluorescent emission distribution having a spacial distribution linearly proportional to the local intensity of the said linear section of the UV beam; said means to produce the fluorescent emission distribution comprising fluorescent material optically transparent to fluorescent wavelengths and extending to receive substantially all radiation entering the entrance aperture;
 means to display the intensity distribution of the linear section of the UV beam as a function of the spacial distribution of the fluorescent emission;
 optical means positioned adjacent the means to produce fluorescent emission distribution receive said fluorescent emission; and
 means to transmit the fluorescent emission from the optical means to the means to display.

13. Apparatus as defined in claim 12 in which the optical means is a plurality of optical fibers.

14. Apparatus as defined in claim 13 wherein the fluorescent emission of said fluorescent material is linearly proportional to the incident UV radiation.

15. Apparatus as defined in claim 14 wherein the fluorescent material is selected from the group consisting essentially of rare earth doped crystals, rare earth doped glasses, undoped crystals and fluorescent mediums suspended in plastic.

16. Apparatus as defined in claim 15 wherein said rare earths are selected from the group consisting essentially of Ce, La, Eu, and Nd.

17. Apparatus as defined in claim 16 wherein said rare earth doped crystals comprise a Ce 3+: YAG.

18. Apparatus as defined in claim 12 in which said means to produce the fluorescent emission distribution comprises a plurality of optical fibers.

19. Apparatus as defined in claim 12 in which said means to produce the fluorescent emission distribution comprises a narrow elongated strip of fluorescent material.

* * * * *